Figure 2:
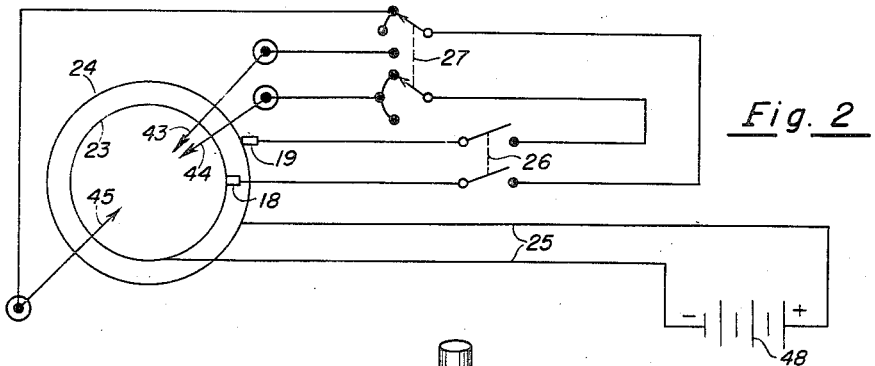

March 4, 1958  E. C. EVANS  2,825,871
ARMATURE WINDING DATA FINDER
Filed June 5, 1953

INVENTOR.
ELMER CHARLES EVANS
BY George Sipkin
George E. Pearson
ATTORNEYS

United States Patent Office 2,825,871
Patented Mar. 4, 1958

2,825,871

ARMATURE WINDING DATA FINDER

Elmer C. Evans, San Diego, Calif.

Application June 5, 1953, Serial No. 359,978

11 Claims. (Cl. 324—51)

(Granted under Title 35, U. S. Code (1952), sec. 266)

The invention described herein may be manufactured and used by or for the Government of the United States of America for governmental purposes without the payment of any royalties thereon or therefor.

This invention relates to electrical testing methods and apparatus and more particularly to a method and apparatus for determining armature winding data.

Many different types of apparatus have been provided for testing armatures to determine faults therein such as shorted or open coils and shorts between bars, and these apparatus have taken many forms. However, none of these devices are applicable to the problem of determining the type of winding on an armature. Many manual methods have been utilized in an attempt to determine the type of winding, and these methods usually resolve into a stripping of the armature and a careful analysis of the windings while stripping in order to determine the type of winding and the way in which it is wound on the armature core and connected to the commutator bars. None of these methods or apparatus provided a simple, fast, reliable and inexpensive method of determining the data necessary for rewinding an armature.

The present invention consists of a novel method of determining the data necessary for rewinding an armature regardless of its condition, and one preferred embodiment of apparatus for carrying out the method wherein a turntable is provided for rotatably mounting an armature and has three adjustable prods which are selectively supplied by current from a six-volt battery. A compass is mounted on a stationary base which contains sliprings to bring the battery supply to the prods on the turntable. A three position switch is provided for use with lap or wave-wound armature and a bar test position, and an on-and-off battery supply switch may also be provided, if desired. In carrying out the method with this apparatus the necessary data for rewinding an armature may be readily determined such as whether the winding is lap or wave-wound, progressive or retrogressive, the span throw and the number of coils per slot. All of this information can be obtained without stripping the armature. By stripping and counting the conductors in one slot and checking the wire size, complete and accurate information is obtained. This apparatus is particularly advantageous in obtaining information where a number of different types of windings are placed on the same armature or on a common drum, such as dyna-motors, converters, multi-duty motors, etc., where the lower windings might be damaged during removal and recording of the top windings.

One object of the present invention is to provide an improved method for determining the necessary data for rewinding a simple or complex armature in a minimum time and without damaging any lower windings.

Another object of the present invention is to provide improved apparatus for determining the data necessary for rewinding an armature such as whether the winding is lap or wave-wound, progressive or retrogressive, the span throw and the number of coils per slot without removing any of the windings from the armature.

Figure 1:
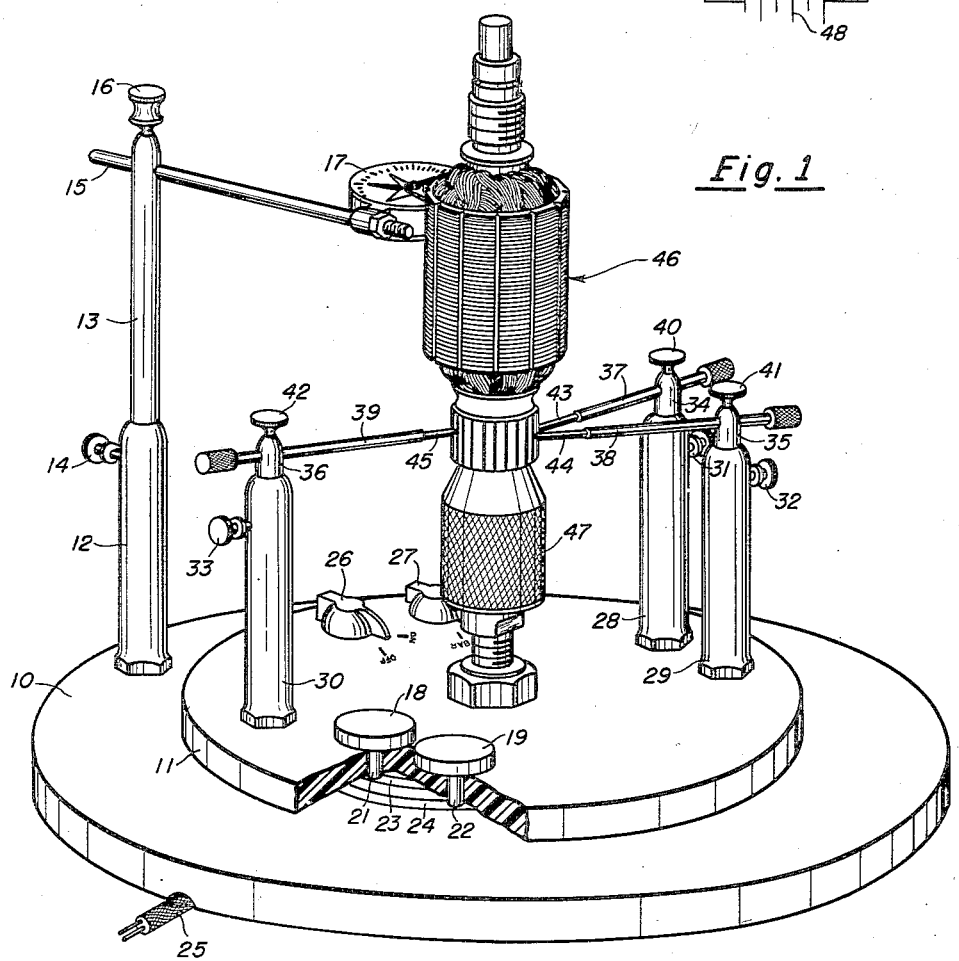

Other objects and many of the attendant advantages of this invention will be readily appreciated as the same becomes better understood by reference to the following detailed description when considered in connection with the accompanying drawings wherein:

Fig. 1 is a pictorial view illustrating one preferred embodiment of the apparatus of the present invention and Fig. 2 is a circuit diagram showing the electrical circuit utilized in conjunction with the apparatus of Fig. 1.

Referring now to the drawings in detail and more particularly to the apparatus shown in Fig. 1, a stationary base 10 is provided upon which a turntable 11 is rotatably mounted. A vertically adjustable mount 12 is also secured to the stationary base 10 and is provided with an extensible member 13 which is secured in any adjusted position by the adjusting nut 14.

A transverse arm 15 is slidably mounted in a transverse bore (not shown) in the member 13 and may be secured in any adjusted position by the set screw 16. A conventional magnetic compass 17 is rigidly secured to the end of the arm 15 so that it may be positioned closely adjacent the slot in the armature during use of the device.

The turntable 11 is rotatably mounted on the stationary base 10 by any conventional means and is provided with a pair of brush holders 18 and 19 which maintain the brushes 21 and 22 resiliently in contact with the metallic conducting slip rings 23 and 24 respectively.

The slip rings 23 and 24 are suitably connected through a conduit 25 to a suitable source of D.-C. voltage not shown in Fig. 1 but indicated schematically in the circuit diagram of Fig. 2.

A battery supply switch 26 is suitably connected to the slip rings 23 and 24 and also to the contacts of a three position control switch 27, as indicated schematically in Fig. 2.

Three adjustable prod mounts 28, 29 and 30 are suitably secured on the turntable 11 as shown in Fig. 1 and are suitably connected to the three-position control switch 27 as indicated in the circuit diagram of Fig. 2. Mounts 28 and 29 are mounted adjacent to each other on one side of the turntable, and mount 30 is secured at a diametrically opposite point for a purpose to be described infra in connection with the operation.

The mounts 28, 29 and 30 are each provided with set screws 31, 32 and 33 respectively for holding the vertically movable telescoping sections 34, 35 and 36 in any desired position.

The spring loaded prods 37, 38 and 39 extend through suitable transverse bores in the members 34, 35 and 36 and may be secured in any adjusted position by the set screws 40, 41 and 42 respectively. Each of the prods 37, 38 and 39 is provided with a small spring (not shown) for resiliently urging the pointed contacts 43, 44 and 45 into engagement with certain commutator bars of the armature 46, as desired.

Armature 46 is adapted to be mounted in a chuck 47 of conventional construction which is concentrically mounted on the turntable 11 for rotation therewith.

Operation

In the operation of the device the armature 46 is mounted in the chuck 47 on a turntable 11 and the contact points 43 and 44 of the adjustable prods 37 and 38 are moved into contact with any two adjacent commutator bars on the armature 46, and the contact point 45 of prod 39 is adjusted to make contact with a commutator bar diametrically opposite one of the adjacent bars contacted by points 43 and 44.

With the battery switch 26 in the "Off" position a reading of resistance is taken between prods 37 and 38 using a standard ohmmeter, and then another resistance reading is taken between either prod 37 or prod 38 and prod 39 to determine whether the armature is lap or wave-wound. A lesser reading across prods 37 and 38 would indicate that the armature is lap-wound; whereas, a lesser reading between either prod 37 or prod 38 and prod 39 would indicate that the armature is wave-wound.

The three-position control switch 27 is next turned to either lap or wave as determined by the above procedure. Then the battery supply switch 26 is turned to the "On" position which energizes a single coil of the armature winding.

The turntable 11 is slowly rotated on the stationary base 10 until the needle on the pocket compass 17 is tangent to the armature. This will occur immediately over the slot in which the winding is laid. This slot is marked by chalk or some other suitable means, and the turntable is rotated again until another tangent point is found, and a slot marked under this point. The smallest number of segments between the marked slots is the span of the winding.

In connection with the procedure above for marking the slots, the armature should be turned or the prods adjusted so that the prods in use are in position to contact the adjacent pairs of commutator bars in both directions to determine whether the coils connected to these bars are laid in the same slots. In this way it is possible to determine whether you have a simplex, duplex, or triplex type of winding, i. e., the number of coils per slot, where more than one coil is laid or wound in each pair of slots and connected to different commutator bars. Of course it will be apparent from the ratio of the number of slots to the number of commutator bars that a particular armature is simplex, duplex, or triplex wound, but with the present method utilizing the apparatus disclosed herein it may be readily determined which commutator bars should be connected to the coils in a particular pair of slots by marking the commutator bars connected to the coils in these slots.

The turntable is again rotated until the compass needle points to the center of the span. If the north pole seeking end of the compass needle points toward the armature center, the winding is progressive with the polarity of the battery 48 as shown in the circuit diagram of Fig. 2. This relationship can be experimentally determined by testing a known winding with any polarity of the battery. In testing the winding to determine whether it is progressively or retrogressively wound, it is necessary to turn the control switch 27 to the position for energizing the adjacent prods in contact with adjacent commutator bars for either the lap or wave winding.

The armature can now be speedily stripped and by counting the conductors in but one slot and checking the wire size a complete and accurate recording of the armature data necessary for rewinding is attained.

Utilizing the present method and apparatus it is possible to record armature data in a few minutes that required up to several hours by the systems previously used. This is especially true for armatures having dual or plural windings on a common drum, such as dynamotors, converters, multi-duty motors, etc. These units now require careful removal and recording of the top windings without damage to the lower windings so that they may also be recorded. Utilizing previous methods and apparatus of recording data slight errors are easily made which resulted in the motor or generator being rewound improperly. Consequently, there was loss in efficiency and more frequent burning out of the armature on a slight overload. These errors in rewinding would then be duplicated on the next rewinding resulting in the motor generator being discarded or rewound many times. Furthermore, where the data is recorded during the stripping process any damage or interchange of the lead positions will prevent the recording of complete and accurate data which will often necessitate obtaining the correct data from the manufacturer or designer, and in some instances this is impossible due to the age of the unit or to the obliteration or loss of the name plate on the machine. This results in long periods of delay in placing it back into service. Use of the present method and apparatus substantially precludes most possibilities of mistakes or inaccuracies due to the factor of human error in recording armature rewinding data.

It will be obvious that the broad concepts of the present invention may be carried out in numerous ways without departing from the spirit and scope of the present invention. The armature could be rotatably mounted in a horizontal rather than a vertical position and set up on a stationary support with the contacts applied to the desired commutator bars by any suitable means. The pocket compass or other means for picking up the magnetic flux and determining its strength and direction with relation to the armature could be rotated around the armature either manually or by suitable mechanical means.

The D.-C. current supply may come from an external source or from a dry plate rectifier mounted in the base and supplied with A.-C. current in place of the battery supply illustrated.

The method of the present invention could also be carried out utilizing A.-C. current and providing a test wand consisting of a single or dual wound induction coil to pick up the induced signals and indicate the relative strength and polarity by comparison with the supplied voltage in place of the compass needle utilized in the embodiment of the present invention as disclosed herein.

The present apparatus and method could be utilized with only the two adjacent prod contacts for both lap and wave windings, but the provision of the third prod contact for selective use in conjunction with one of the two adjacent prod contacts facilitates the use with wave windings, and also permits the use of the apparatus for bar-to-bar tests, where voltage is applied to opposite sides of the commutator and readings of the voltage drops across the commutator bars are obtained with a suitable meter.

The three position switch 27 is used to aid the unskilled operator by indicating the proper position for each operation; however, there are only two different electrical connections, so that a two position switch could be utilized with suitable instructions.

Obviously many modifications and variations of the present invention are possible in the light of the above teachings. It is therefore to be understood that within the scope of the appended claims the invention may be practiced otherwise than as specifically described.

What is claimed is:

1. Electrical testing apparatus comprising a plurality of means for selectively contacting certain of the commutator bars on an armature, direct current means for selectively energizing certain of said contact means from a source of electrical power, and means including a magnetic compass for determining the relative direction with respect to the direction of current flow from said direct current means of the magnetic field created by energization of the coils in said armature connected to said commutator bars through said means contacting said commutator bars.

2. Electrical testing apparatus comprising means for supporting an armature, a plurality of means for selectively contacting certain of the commutator bars on said armature, direct current means for selectively energizing certain of said contact means from a source of electrical power, means positioned adjacent the slots of said armature for determining the relative direction of the magnetic field created by energization of the coils in said armature through said means contacting said commutator bars with respect to the direction of current flow from said direct current means, and means for mounting said armature and said means for determining the magnetic field for relative rotation therebetween about an axis concentric with the axis of said armature.

3. Electrical testing apparatus comprising a stand, a turntable rotatably supported on said stand and having means for concentrically supporting an armature thereon, compass means mounted on said stand and positionable adjacent the windings of said armature for determining the direction of the magnetic field adjacent said armature, a plurality of adjustable prod contacts mounted on said turntable, said contacts being positionable for selective engagement with certain commutator bars on said armature, and means for connecting a source of electrical energy selectively to certain of said prod contacts.

4. Electrical testing apparatus comprising a stand, a turntable rotatably supported on said stand and having means for concentrically supporting an armature thereon, a compass adjustably mounted on said stand and positionable adjacent the windings of said armature with the needle thereof movable in a plane perpendicular to the axis of said armature, a plurality of adjustable prod contacts mounted on said turntable, said contacts being positionable for selective engagement with certain commutator bars on said armature, two of said prods being mounted adjacent each other on one side of said armature mounting means and another of said prods being mounted on said turntable on the diametrically opposite side of said armature mounting means, means for connection to a source of direct current, means for supplying said direct current to said turntable, and switch means for selectively connecting said direct current supply to certain pairs of said prod contacts.

5. An armature winding data finder of the character disclosed comprising the combination of a stand, a turntable rotatably supported on said stand and having means for supporting the armature to be tested concentrically thereon, a plurality of prods adjustably supported on said turntable for selective engagement with the commutator segments of said armature, a source of electrical power, circuitry including switch means for energizing said prods from said source selectively in accordance with the type of the armature winding, and a magnetic compass supported on said stand for movements of the needle thereof tangentially and diametrically of the armature as the turntable is rotated.

6. The method of finding armature data comprising the steps of determining the armature winding type by selectively contacting certain commutator bars connected to certain individual coils of said armature for comparative resistance measurements of said coils indicative of the winding type, energizing the armature selectively in accordance with its winding type by contacting and applying electrical energy to said commutator bars providing a resistance measurement indicative of the winding type, and selectively rotating the energized armature in the field of a magnetic compass to position the needle thereof either tangentially or diametrically of the armature to determine the span of said winding.

7. A method of determining data for rewinding an armature comprising the steps of selectively energizing a certain coil of said armature by supplying current to certain commutator bars of said armature, determining the type of armature winding by locating the slots in which said coil is laid by finding the position of the maximum magnetic field adjacent said slots, and determining the relative direction of said field as compared with the direction of current flow energizing the coils.

8. The method of determining data for rewinding an armature comprising the steps of energizing certain individual coils of said armature by applying a voltage to certain commutator bars of said armature, determining the type of armature winding by locating the slots in which the coil connected to said commutator bars is laid by finding the positions of maximum magnetic field intensity adjacent said armature, and determining the relative direction of the magnetic field induced by energizing said coil as compared to the direction of the current flow energizing said coils.

9. The method of determining data for rewinding an armature comprising the steps of energizing certain individual coils of said armature by applying a voltage to adjacent commutator bars of said armature, determining type and span of the armature winding by locating the slots in which the coil connected to said commutator bars is laid by finding the positions of maximum magnetic field intensity adjacent said armature, and determining the relative direction of the magnetic field induced by energizing said coil as compared to the direction of a field induced in an armature having a known type of winding.

10. The method of determining data for rewinding an armature comprising the steps of energizing certain individual coils of said armature by applying a voltage to diametrically opposite commutator bars of said armature, determining the span of the armature winding by locating the slots in which the coil connected to said commutator bars is laid by finding the positions of maximum magnetic field intensity adjacent said armature, applying a voltage to adjacent commutator bars, and determining the relative direction of the magnetic field induced thereby as compared to the direction of the current flow energizing said coils.

11. The method of determining data for rewinding an armature comprising the steps of energizing certain individual coils of said armature by applying a D.-C. voltage to certain commutator bars of said armature, determining the slots in which the coil connected to said commutator bars is laid by finding the positions of maximum magnetic field intensity in a direction tangential to said armature, and determining the relative direction of the magnetic field in a direction radially with respect to said armature induced by energizing said coil as compared to the direction of a field induced in an armature having a known type of winding.

References Cited in the file of this patent

UNITED STATES PATENTS

| | | |
|---|---|---|
| 2,600,088 | Ward | June 10, 1952 |
| 2,600,857 | De La Mater | June 17, 1952 |
| 2,644,919 | Duke et al. | July 7, 1953 |